Feb. 14, 1933. J. M. HALL 1,897,730
SHOCK ABSORBER
Filed Feb. 24, 1925 2 Sheets-Sheet 1

Inventor
Joseph M. Hall
By Poff & Powers
Attys

Feb. 14, 1933.  J. M. HALL  1,897,730
SHOCK ABSORBER
Filed Feb. 24, 1925  2 Sheets-Sheet 2
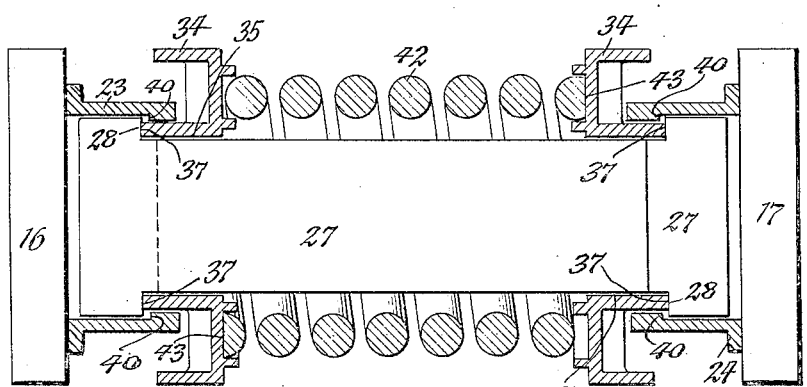
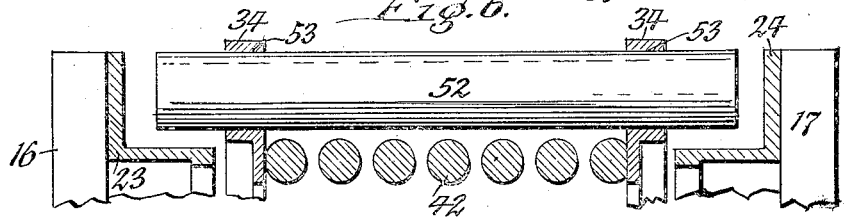
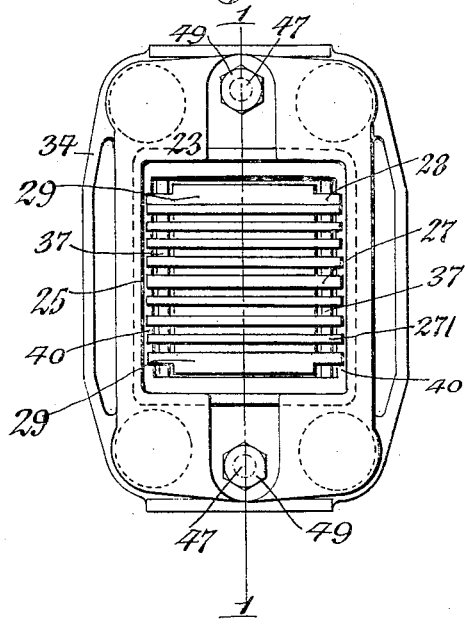
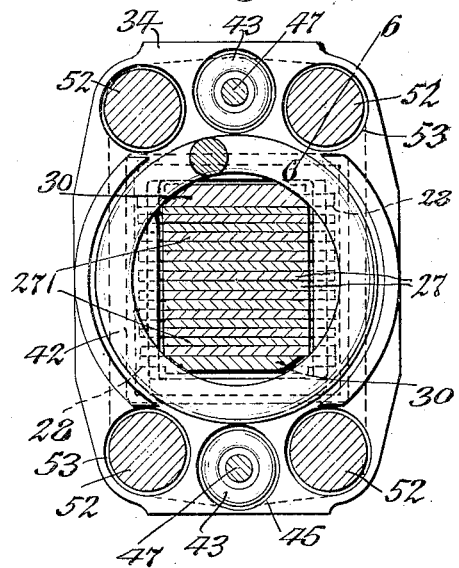
Inventor
Joseph M. Hall
By Popp & Powers
Attys Patented Feb. 14, 1933

1,897,730

UNITED STATES PATENT OFFICE

JOSEPH MARCHAND HALL, OF HAMILTON, ONTARIO, CANADA, ASSIGNOR TO UNIVERSAL DRAFT GEAR ATTACHMENT CO., A CORPORATION OF ILLINOIS

SHOCK ABSORBER

Application filed February 24, 1925. Serial No. 11,001.

This invention relates to a shock absorber which is more particularly designed for use as a friction draft gear on railway cars to reduce the shock on the same when subjected to pulling and pushing or buffing strains and which includes among other elements a plurality of sets of intercalated friction plates which are pressed laterally against each other and also slide lengthwise relatively to each other during the operation of the gear.

One of the objects of this invention is to so design the gear that a lesser amount of the resistance of the main or thrust spring is consumed for producing lateral pressure on the friction plates when closing or setting up the gear and thus leave a greater amount of the resistance of the main or thrust spring available for taking the shock of the load and thereby increase the capacity of the shock absorber accordingly.

Another object of this invention is to improve the means for limiting the separation of the housing and the main thrust members and cause the latter to be moved longitudinally outward together with the friction plates by the resilience of the release springs in the event that the main thrust springs fail to separate the friction plates lengthwise from each other during the release action of the gear.

In the accompanying drawings:—

Figure 3 is a longitudinal section taken on line 3—3, Fig. 1.

Figure 4 is an end view of the shock absorber with the follower omitted.

Figure 5 is a cross section taken on line 5—5, Fig. 1.

Figure 6 is a fragmentary longitudinal section taken on line 6—6, Fig. 5.

Similar characters of reference indicate the same parts in the several views of the drawings:—

In the preferred organization of my invention the same is mounted between two followers 16 and 17 arranged transversely relative to the longitudinal line of the pulling and pushing or buffing strains and slidingly supported at their opposite ends on the longitudinal sills or beams of the car frame or body in the usual and well known manner so that these followers can move one toward the other but the extent of their separation being limited by the usual draft lugs on the sills engaging with the outer sides of the followers.

The shock absorber comprises two outer end thrust heads or wedge casings 23 and 24, preferably of cast metal arranged transversely between the car sills and engaging at their rear or outer sides, respectively, with the inner or front sides of the followers. Each of these end thrust heads is provided with a central opening 25 and on opposite sides of the front end of this opening the respective head is provided with inclined faces 26 which diverge forwardly or inwardly, as shown in Figs. 1 and 2.

Figure 1:
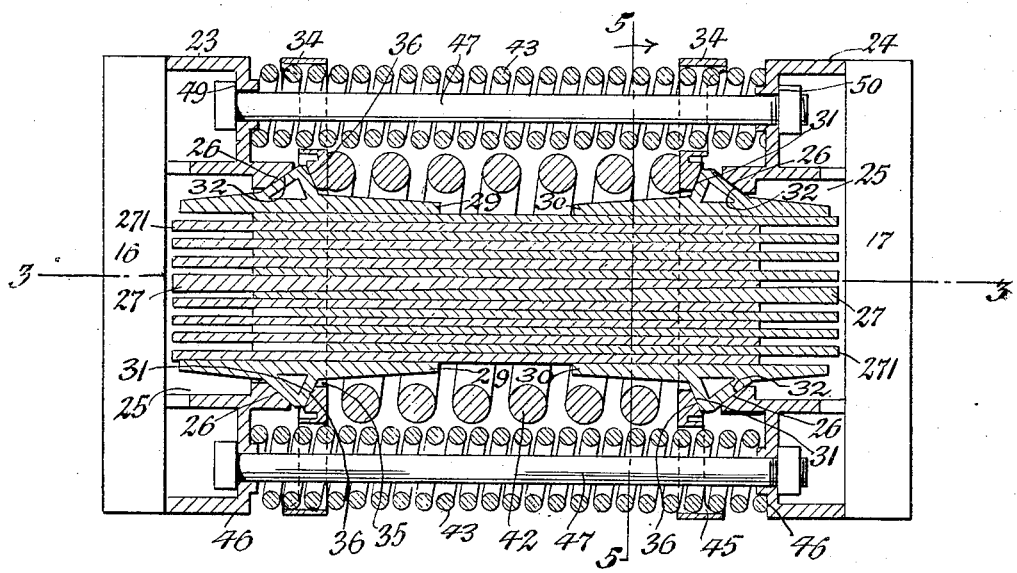
Figure 1 is a longitudinal section of a friction draft gear or shock absorber taken on line 1—1, Fig. 4, embodying my invention, and showing the same in a released or open position.
Figure 2:
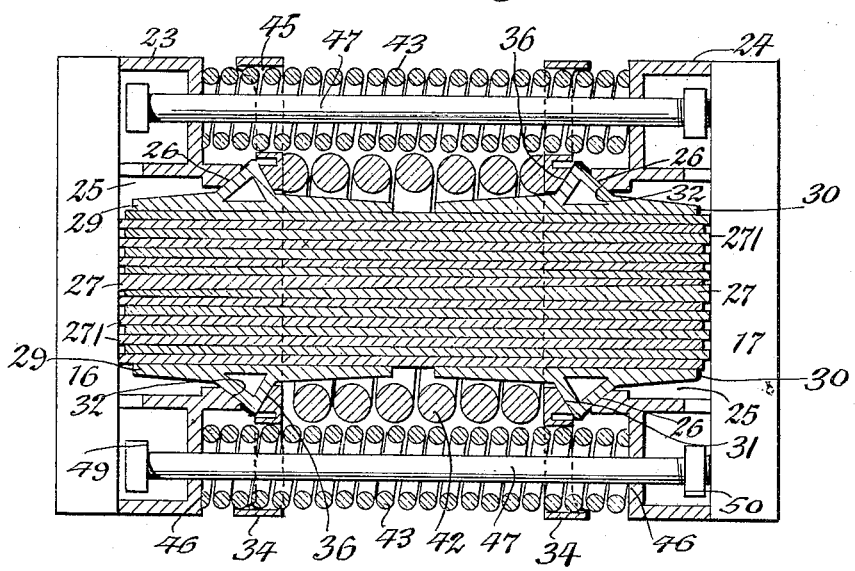
Figure 2 is a similar view showing the same in a closed or set up position.

Between the two thrust heads are arranged two sets of intercalated friction plates 27, 271, the outer ends of the plates of one set being arranged in the central opening 25 of one thrust head and adapted to be engaged and disengaged with the inner side of the respective follower and the inner ends of each set of plates alternating with the inner ends of the plates of the other set, as shown in Figs. 1 and 2. Each set of friction plates is made up partly of plates which have their flat sides arranged parallel and other plates which have their flat sides inclined and converging forwardly so as to form wedges. The number of parallel sides and wedge friction plates in each set may vary and the same may be variously disposed, for example, one pair of co-operating wedge shaped friction plates 27 may be arranged centrally in the two sets and have their narrow ends facing forwardly or inwardly and two groups of parallel sided friction plates 271 arranged on transversely opposite sides of the central wedge friction plates. The inner ends of the central wedge friction plates and the groups of parallel sided friction plates of both sets are intercalated and when moving one set of these plates forwardly relatively to the other the thickness of the combined sets will be increased due to the thicker parts of the wedge friction plates of each set engaging with the thicker parts of the wedge friction plates of the other set, while upon moving the friction plates of one set rearwardly or outwardly relatively to the other set the combined thickness of the two sets of friction plates will be reduced due to the thinner inner ends of the wedge plates of the two sets being brought into engagement with each other.

Each of the friction plates is provided on the rear portions of its longitudinal edges with forwardly facing shoulders 28 and in the normal or relaxed condition of the shock absorber the outer or rear ends of the friction plates of both sets are spaced apart from the inner or front sides of the respective followers, as shown in Fig. 1.

On opposite flat sides of the outer ends of the two sets of friction plates are arranged two pairs of wedge shoes or presser plates 29, 30, the members of each pair being arranged transversely opposite each other and engaging their inner flat longitudinal sides with the adjacent outer longitudinal flat sides of the respective friction plates to produce a variable pressure upon the same and cause them to engage each other with varying degrees of friction and thus resist relative longitudinal movement of the same accordingly.

The members of each pair of wedge shoes are coupled with one of the thrust heads so as to be compelled to move lengthwise therewith most of the time and also to produce a wedging action of each thrust head against the respective pair of wedge shoes at the corresponding end of the sets of friction plates during the forward movement of the thrust head and thereby not only move the respective wedge shoes forwardly but also press the same transversely inwardly or toward the longitudinal axis of the gear so that the several friction plates of both sets are pressed together and engage each other with increased frictional contact. This is preferably effected by providing the outer side of each wedge shoe with a laterally projecting rib, the rear side of which has an inclined face 32, these faces of the companion wedge shoes at one end of the draft gear diverging forwardly and engaging respectively with the forwardly diverging inclined faces 26 of the respective thrust head, as shown in Figs. 1 and 2.

On its inner or front side each rib of the wedge shoes is provided with an inclined face 31, these faces on the companion wedge shoes converging forwardly.

Surrounding each pair of wedge shoes or presser plates and the adjacent end of the two sets of intercalated friction plates is an intermediate cross head 34 having a central opening 35 which receives the adjacent pair of wedge shoes and those parts of the two sets of friction plates arranged between these wedge shoes, as shown in Figs. 1, 2, 3 and 5. The inner or front sides of these intermediate cross heads are provided with inclined faces 36 which diverge rearwardly and engage respectively with the forwardly facing converging inclined faces 31 on the adjacent wedge shoes, so that a wedging engagement exists between these parts which become effective upon moving the same lengthwise relatively to one another.

Each of the intermediate cross heads is provided on opposite sides of its central opening 35 with two tappets or shoulders 37, 37 which project rearwardly or outwardly through said opening 25 in the respective intermediate cross head and adapted to engage the forwardly facing shoulders 28 at the rear end of one set of friction plates.

The forward movement of each intermediate cross head is effected by engagement of its inclined faces 36 with the front inclined faces 31 on the wedge shoes during the forward movement of the latter. The return or backward movement of the end thrust heads and the intermediate cross head is effected by spring pressure during relaxation of the draft gear.

In the preferred construction shown in the drawings the resilient means which operate constantly to move the intermediate cross heads apart or backwardly consist of a heavy helical main thrust spring 42 arranged lengthwise and surrounding the central parts of the friction plates and the inner ends of the wedge shoes. The inner vertical faces of the intermediate cross heads are provided with spring slots 43 which receive the ends of the main thrust spring for holding the same in place.

The spring means, which tend to yieldingly hold the end thrust heads in their outermost or rearward position and to return the same to this position after the same have been moved forwardly and the load on the gear is relaxed, preferably consist of two helical releasing springs 43 arranged lengthwise on opposite sides of the main thrust spring 42 and each spring, passing through openings 45 in the intermediate cross head so as to form a support and guide for the latter, and bearing at its end against seats 46 in the front sides of the end thrust heads.

Undue separation of the end thrust heads is prevented when the gear is removed from the car by tie rods 47 extending through the release springs and the end heads and each rod adapted to engage the shoulders 49, 50 formed by its head and nut with the rear side of the end thrust heads.

The movement of the end thrust heads toward each other is limited by a plurality of floating stop rods 52 arranged between corresponding corners of the end thrust heads and passing loosely through guide openings 53 in the marginal parts of the intermediate cross heads.

To compel each of the end thrust heads and friction plates associated therewith, to move longitudinally back at certain times, means are provided which preferably consist of outwardly facing shoulders 40 arranged on the inner part of the bore of the opening 25 in the end thrust heads and adapted to be engaged with part of the forwardly facing shoulders 28 on the outer ends of the friction plates.

The operation of the shock absorber is as follows:—

When the several members of the shock absorber are fully assembled and placed in the draft rigging of the car, the main thrust spring and the releasing springs are under an initial compression in the fully released or open position of the gear, as shown in Fig. 1.

If a pulling or a buffing load is now applied to either of the followers sufficient to overcome the initial tension of the springs of the shock absorber one of the end thrust heads will be first moved forwardly toward the other end thrust head a short distance independently of the companion set of friction plates, the extent of this independent movement being governed by the gap or slack between the moving follower and the outer ends of the corresponding set of friction plates. At this time the compression of the release springs is increased by direct engagement of the moving end thrust head and compression of the main thrust spring is also increased by motion transmitted to the same from the moving end thrust head through the intervening wedge shoes.

During this initial forward movement of one of the end thrust heads independently of the companion friction plates, the engagement of the inclines 26 on the end thrust heads and the inclines 36 on the intermediate cross heads with the oppositely inclined faces 32 and 31 on the wedge shoes causes the latter to be pressed transversely inward and thereby increase the frictional contact between the several friction plates of the two sets, thus increasing the frictional resisting capacity of these plates against moving one set of these plates forwardly relatively to the other set of plates. Immediately after this increased frictional engagement between the friction plates has been established the slack between the outer ends of the friction plates and the followers has been taken up and the moving follower, as it continues its forward movement thereafter, causes the set of friction plates in engagement therewith to also move forwardly against the increased frictional resistance between the friction plates and also the constantly increasing resistance of the release springs and the main thrust spring. During such forward longitudinal movement of one set of friction plates relatively to the other set of friction plates, the wedge friction plate of the moving set climbs over the wedge friction plate of the stationary set and thereby causes the combined thickness of the pack or stack of friction plates of both sets to be increased transversely. When this occurs the corresponding wedge shoes of each pair are spread apart, whereby a wedge action of each wedge shoe is produced by engagement of its opposite inclined faces 32, 31 with the corresponding inclined faces 26, 36, on the opposing parts of the end thrust heads and the intermediate thrust heads. This causes the shoes to move forwardly relatively to the end thrust heads and the intermediate cross heads to be forced forwardly to a greater extent from the end thrust heads, whereby a corresponding increase in the compression of the main thrust spring is effected.

By thus employing co-operating wedge shaped members in two sets of friction plates so that a transversely outward movement of the shoes is obtained after the initial transversely inward pressure of the shoes on the friction plates has been effected a greater amount of the cushioning effect of the main thrust spring is obtained and more of the resistance of the main thrust spring is utilized for setting up additional friction between the friction plates, thereby increasing the shock absorbing capacity of the gear accordingly.

When the load on the shock absorber is relieved or removed the release springs first force the end thrust heads apart, thereby reducing the transverse inward pressure of the friction plates against each other and relieving the frictional contact between the same this being due to moving one of the end thrust heads outwardly away from the companion intermediate cross head thus relieving the transversely inward wedging action of the several heads on the respective wedge shoes.

After the first part of the rearward or release action of the gear has been effected by one end thrust head moving away from the other, the companion intermediate cross head moves rearwardly under the expansive action of the main thrust spring and engages its shoulders 37 with the shoulders 28 of the companion set of friction plates, thereby carrying the latter rearwardly.

Sufficient clearance is provided between the shoulders 28 of the friction plates and the shoulders 40 on the end thrust heads to allow the wedging action of the shoes on the friction plates to be entirely removed and these plates to be pulled apart lengthwise until the followers assume their fully opened position and are spaced slightly from the rear ends of the friction plates. Should, however, the main thrust spring for any reason not move the intermediate cross heads apart from one another, and thereby fail to draw the two sets of friction plates lengthwise apart, then the shoulders 40 of the rearwardly moving end thrust head will come into play and engage the shoulders 28 of the companion set of friction plates and pull the same rearwardly into their initial separated position under the action of the releasing springs which will aid the main thrust spring and separate the end thrust head whenever the load is removed from the followers.

By constructing some of the friction plates in the form of wedges prompt release of the gear is obtained inasmuch as the forwardly tapering form of these plates provides more freedom and increased clearance between the plates when separating the same lengthwise as the several parts move to the release position.

I claim as my invention:—

1. A friction shock absorber comprising opposed thrust heads adapted to be arranged in front of followers which are movable one toward and from another, a plurality of sets of intercalated friction plates mounted in said heads, some of said plates having parallel sides and others being tapered, one tapered forwardly and the other tapered rearwardly, and means for impressing a lateral pressure on said plates comprising wedge shoes engaging the outer sides of said sets of plates at opposite ends of the same and each shoe provided on its outer side with an outwardly inclined face and an inwardly inclined face, inwardly diverging inclined faces arranged on each thrust head and engaging with the outwardly inclined faces of the wedge shoes on the adjacent ends of the plates, releasing springs interposed between the thrust heads, intermediate cross heads each having inwardly converging inclined faces engaging with the inwardly inclined faces of the adjacent wedge shoes, and a main thrust spring interposed between said intermediate cross heads.

2. A friction shock absorber comprising opposed thrust heads adapted to be arranged in front of followers which are movable one toward and from another, a plurality of sets of intercalated friction plates mounted in said heads, and each provided at its outer end with an inwardly facing shoulder, outwardly facing shoulders arranged on said thrust heads and adapted to engage with the inwardly facing shoulders of said friction plates, intermediate cross heads having outwardly facing shoulders adapted to engage with the shoulders of said friction plates, shoes engaging with the outer sides of said plates and having wedging engagement with said thrust heads and cross heads, and spring means for yieldingly resisting inward movement of said thrust heads and cross heads.

In testimony whereof I affix my signature.

JOSEPH MARCHAND HALL.